United States Patent [19]

Mizukawa

[11] Patent Number: 5,631,772
[45] Date of Patent: May 20, 1997

[54] TELESCOPE PROVIDED WITH AUTOMATICALLY OPENING AND CLOSING COVER

[75] Inventor: Shigeo Mizukawa, Omiya, Japan

[73] Assignee: Fuji Photo Optical Co., Ltd., Saitama, Japan

[21] Appl. No.: 533,202

[22] Filed: Sep. 25, 1995

[30] Foreign Application Priority Data

Sep. 30, 1994 [JP] Japan .................................. 6-261042

[51] Int. Cl.⁶ .................... G03B 11/04; G02B 23/00
[52] U.S. Cl. ................... 359/511; 359/399; 359/508; 359/611
[58] Field of Search ............... 359/399, 404–407, 359/409, 480–481, 503–508, 511, 600–613, 227; 33/244, 245; 354/287, 288 R, 288 A, 295

[56] References Cited

U.S. PATENT DOCUMENTS

| | | | |
|---|---|---|---|
| 3,390,931 | 7/1968 | Luning et al. | 33/244 |
| 5,003,697 | 4/1991 | Hampton | 359/511 |
| 5,294,954 | 3/1994 | Nomura et al. | 359/511 |

FOREIGN PATENT DOCUMENTS

| | | | |
|---|---|---|---|
| 2640772 | 3/1978 | Germany | 359/513 |
| 244026 | 10/1987 | Japan | 359/611 |

*Primary Examiner*—Thong Nguyen
*Attorney, Agent, or Firm*—Townsend & Banta

[57] ABSTRACT

A telescope provided with an automatically opening and closing lens cover which obviates a protective cap attached to the main body. The telescope is provided with a lens hood disposed along a cylinder of the main body in such a manner as to be slidable forward and backward, and two movable lens covers disposed in such a manner as to cover the objective lenses provided at one end of the cylinder. The two lens covers are axially rotatably supported between the objective lenses. A guide pin is attached to the side surface of each lens cover, and a guide groove is provided on the inner surface of the lens hood in such a manner as to be engaged with the guide pin so as to open and close the lens cover by the forward and backward movements of the lens hood. When the lens hood is moved forward and the lens covers covering the objective lenses are opened, thereby enabling observation. When the lens hood is moved backward in this state, the lens covers are replaced to the original position and closed. This structure is also applicable to a monocular telescope.

4 Claims, 4 Drawing Sheets

TELESCOPE PROVIDED WITH AUTOMATICALLY OPENING AND CLOSING COVER

BACKGROUND OF THE INVENTION

This application claims the priority of Japanese Patent Application No. 6-261042 filed on Sep. 30, 1994.

1. Field of the Invention

The present invention relates to a mechanism of automatically opening and closing a cover for protecting the objective lens of a monocular or binocular telescope.

2. Description of the Related Art

Telescopes adopt various structures for forming an image on the retina, but they are fundamentally divided into a structure for observing an object with a single eye and a structure (binoculars) for observing an object with both eyes. The objective lens of such a telescope is covered with a protective cap so as to protect the lens surface from dust and from being scratched.

In a conventional telescope, however, a protective cap removed when observing an object is inconvenient to handle. Since it is necessary to remove the protective cap and put it into a bag or a pocket when an object is observed, and to take it out of the bag or the pocket and attach it to the lens when the observation is finished, it is often the case that the protective cap is lost. That is, the management of the protective cap is troublesome.

If the protective cap is tied to the main body by a chain or the like in order to facilitate the management, the protective cap becomes a hindrance at the time of observation. In a compact camera or the like, a cover as a protective cap is attached to the front surface of the objective lens on the main body in such a manner as to be slidable rightward and leftward by the operation of a button. However, it is difficult to apply such a mechanism to a cylindrical telescope.

SUMMARY OF THE INVENTION

Accordingly, it is an object of the present invention to eliminate the above-described problems in the related art and to provide a telescope provided with an automatically opening and closing lens cover in place of a conventional protective cap which is attached and removed to and from the main body, thereby obviating the management of the protective cap To achieve this end, in one aspect of the present invention, there is provided a telescope provided with an automatically opening and closing lens cover comprising: a lens hood disposed along an outer peripheral portion of the cylinder of the main body in such a manner as to be slidable forward and backward; a movable lens cover disposed in such a manner as to cover objective lens provided at one end of the cylinder; and an automatic cover opening and closing mechanism which shunts the lens cover out of the optical path together with the forward movement of the lens hood, while moving the lens cover to the position at which the lens cover covers the objective lens together with the backward movement of the lens hood.

According to this structure, when the lens hood is moved forward, the lens cover covering the objective lens is opened together with the movement of the lens hood, thereby enabling observation. When the lens hood is moved backward in this state, the lens cover is also moved to the original position and closed together with the backward movement of the lens hood. That is, the lens cover is automatically opened and closed together with the lens hood setting and replacing operations.

In another aspect of the present invention, two movable lens covers are disposed in correspondence with the objective lenses of a binocular telescope, and the two lens covers are axially rotatably supported between the objective lenses. A guide pin is attached to the side surface of each lens cover, and a guide groove is provided on the inner surface of the binocular lens hood in such a manner as to be engaged with the guide pin so as to open and close the lens cover by the forward and backward movements of the lens hood.

This structure is applied to a binocular telescope. The movement of the lens hood is transmitted to the lens covers by the engagement of the guide grooves and the guide pins, and when the lens hood is moved forward, the two lens covers are rotated around the respective shafts and join between the objective lenses, thereby assuming an opened state. At this time, the two lens covers function as a central parting strip in the binocular lens hood. When the lens hood is moved backward in this state, the lens covers are rotated from between the objective lenses, thereby assuming a closed state. The objective lenses are thus covered and protected.

In still another aspect of the present invention, one movable lens cover is disposed in such a manner as to be axially rotatably supported at the outer peripheral portion of the cylinder of the main body, and a guide pin is attached to the side surface of the lens cover. A guide groove is provided on the inner surface of the binocular lens hood in such a manner as to be engaged with the guide pin so as to open and close the lens cover together with the forward and backward movements of the lens hood. This structure is applicable both to a telescope composed of a monocular objective lens and to a binocular telescope composed of binocular objective lenses.

The above and other objects, features and advantages of the present invention will become clear from the following description of the preferred embodiments thereof, taken in conjunction with the accompanying drawings.

DESCRIPTION OF THE PREFERRED EMBODIMENTS

Figure 1:
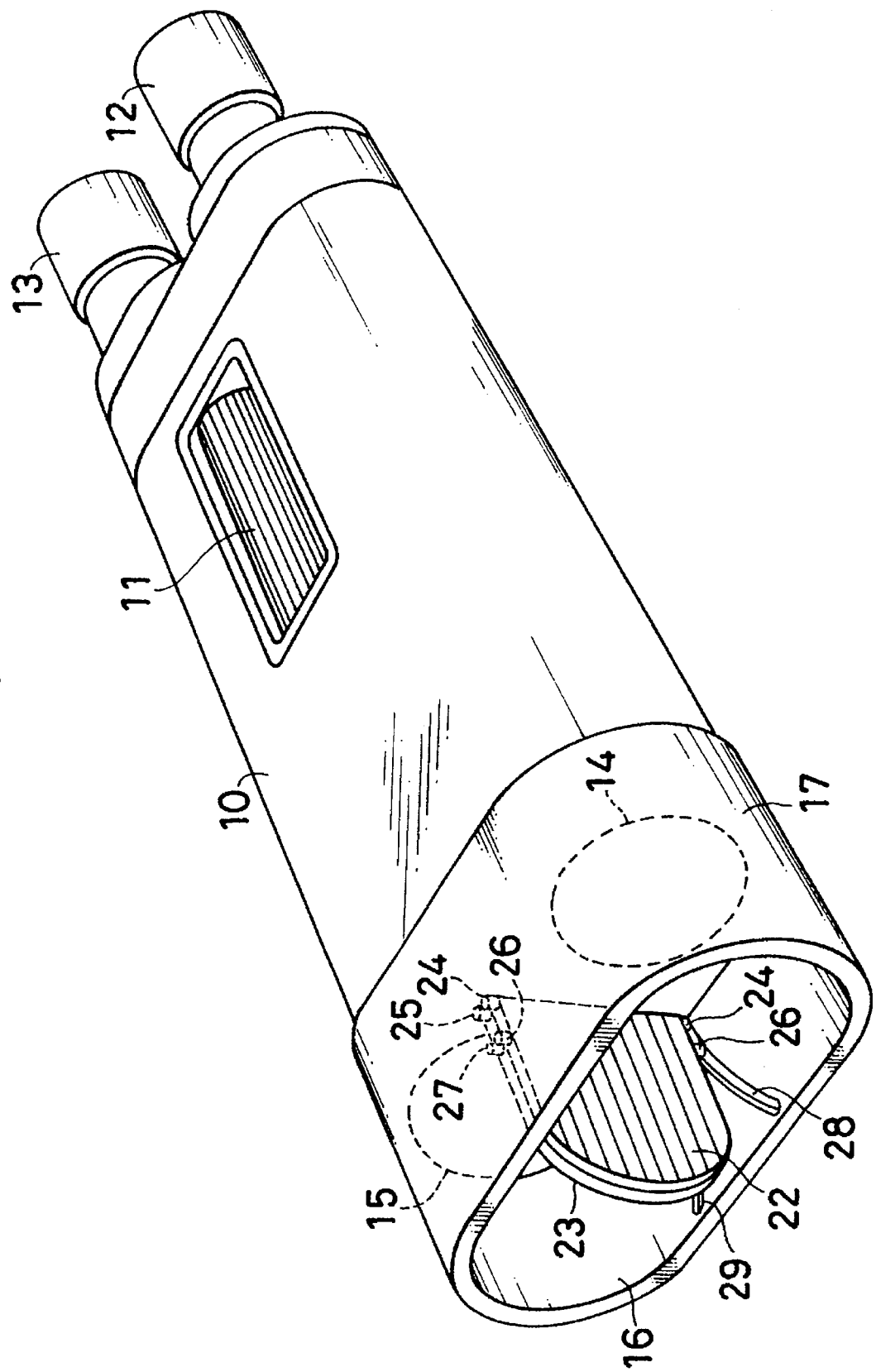
FIG. 1 is a perspective view of the structure of a first embodiment of a telescope (binocular telescope) provided with automatically opening and closing lens covers according to the present invention.
Figure 2:
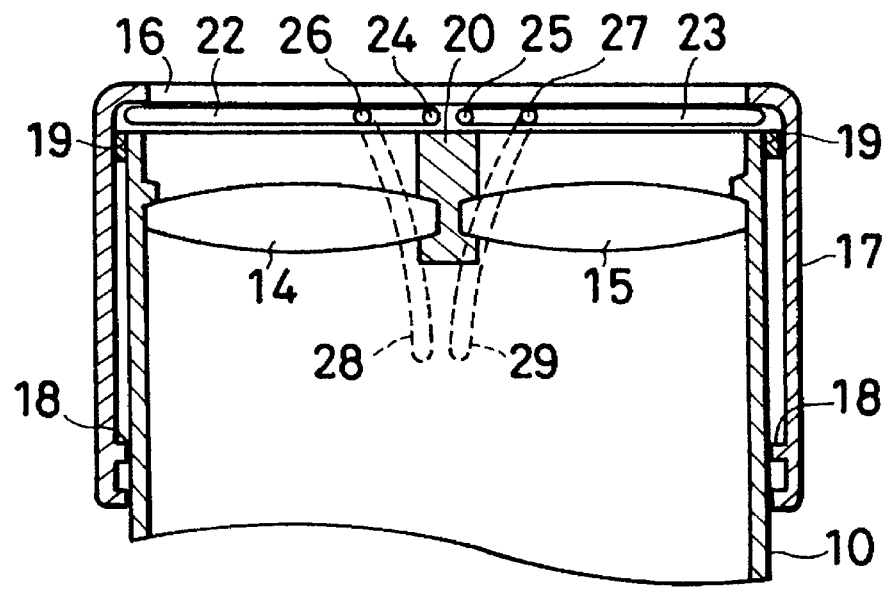
FIG. 2 is a sectional view (top view) of the first embodiment shown in FIG. 1 when the lens covers are closed.
Figure 3:
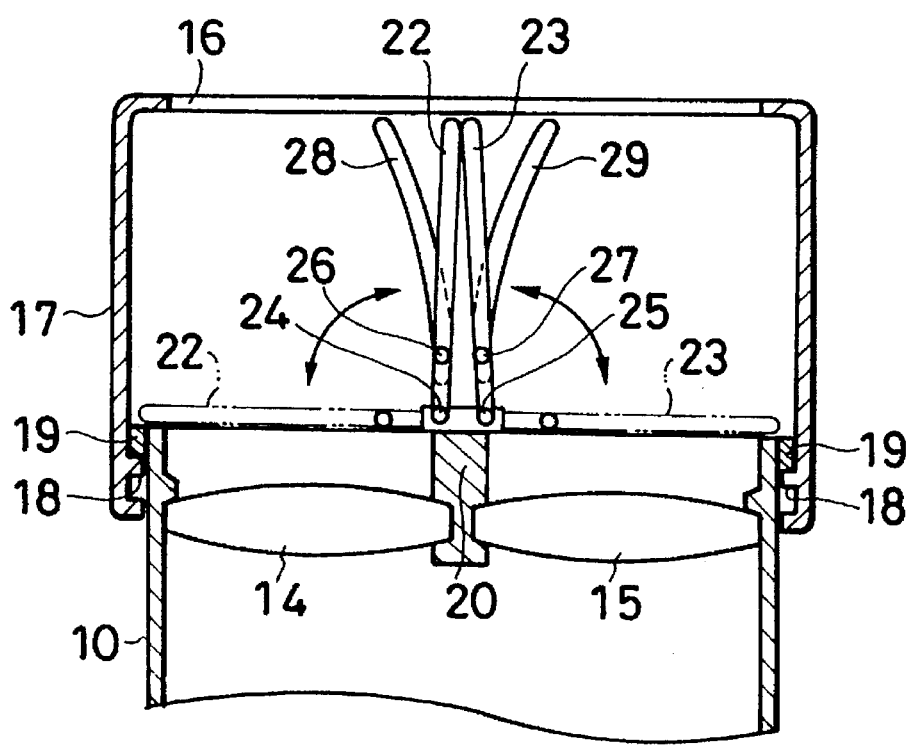
FIG. 3 is a sectional view (top view) of the first embodiment shown in FIG. 1 when the lens covers are opened.

FIGS. 1 to 4 show the structure of a first embodiment of a telescope (binocular telescope) provided with automatically opening and closing lens covers according to the present invention. As shown in FIG. 1, a magnification adjusting knob 11 is disposed on the upper surface of a cylinder 10 of the main body. Right and left eyepieces 12, 13 are provided at one end of the cylinders forming main body 10, and objective lenses 14, 15 are provided at the other end thereof, as shown in FIGS. 2 and 3. A lens hood 17 having an opening 16 is placed over the cylinders in the vicinity of the objective lenses 14, 15 in such a manner as to be slidable along the outer periphery of the cylinders. The lens hood 17 serves to intercept unnecessary light which obliquely enters the two objective lenses 14, 15. The lens hood 17 is movable forward until an engaging portion 18 is engaged with a stopper 19 of the cylinders.

Two lens covers 22, 23 are attached to a supporting portion 20 between the objective lenses 14, 15 on the end surface of the cylinder 10 by vertically disposed support shafts 24, 25, respectively. Guide pins 26, 27 are attached to the upper and lower end surfaces of the lens covers 22, 23. Guide grooves 28 which are engaged with the guide pins 26 and guide grooves 29 which are engaged with the guide pins 27 are formed on the upper and lower inner surfaces of the lens hood 17 (The guide pins 26, 27 and the guide grooves 28, 29 may be formed only either of the upper and lower sides). The guide grooves 28, 29 are shaped into a form which enables the lens covers 22, 23 to rotate 90 degrees so as to be opened and closed by guiding the corresponding guide pins 26, 27 when the lens hood 17 is moved forward and backward, respectively.

Figure 4:
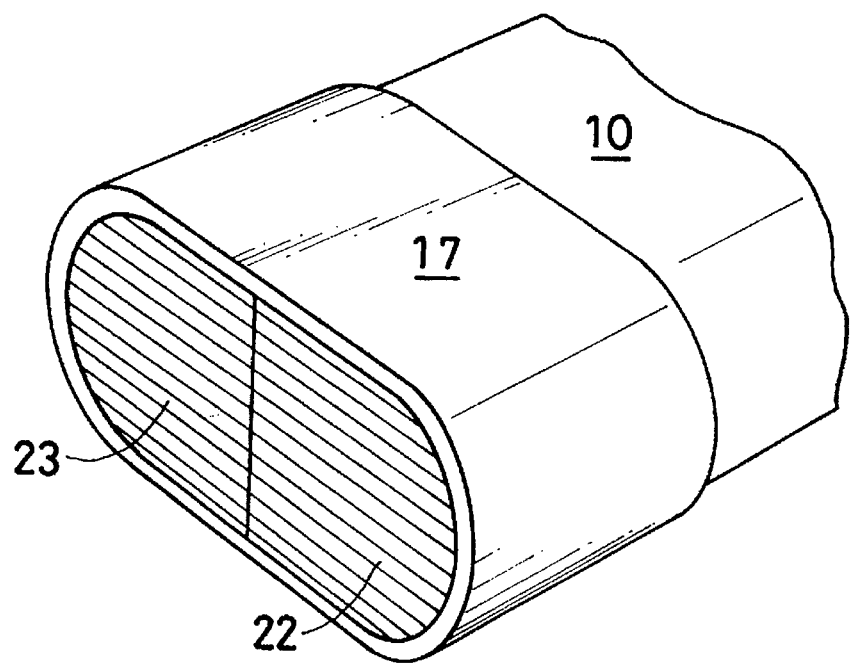
FIG. 4 is a perspective view of the first embodiment when the lens covers are closed.

The structure of the first embodiment having the above-described structure will now be explained. FIGS. 2 and 4 show the embodiment with the lens hood 17 at the original position when the embodiment is not used. In this state, the lens covers 22, 23 are disposed in such a manner as to cover the opening portions of the objective lens assemblies, and the peripheral edge portion of the lens hood 17 at the forward end portion holds and pressed the lens covers 22, 23. In this way, the front surfaces of the objective lenses 14, 15 are completely covered and protected. In contrast, FIG. 3 shows the embodiment with the lens hood 17 slid to the forward position when the embodiment is used. At this time, the guide pins 26, 27 are moved toward the support shafts 24, 25 along the guide grooves 28, 29. Consequently, the lens cover 22 is rotated clockwise 90 degrees, while the lens cover 23 is rotated counterclockwise 90 degrees, so that they join at the central portion, thereby shunting out of the optical path, as shown in FIG. 3.

In this manner, the lens hood 17 is moved forward and the lens covers 22, 23 are also moved to the position that exposes the opening portion of the objective lens assemblies, thereby enabling observation through the binocular telescope. At this time, the two lens covers 22, 23 joined at the central portion function as a central parting strip of the lens hood 17, thereby enabling good observation. When the lens hood 17 is moved backward after the observation, the lens covers 22, 23 are moved to the original position by the reverse of the above operation so as to cover the opening portions of the objective lens assemblies, as shown in FIGS. 2 and 4.

According to the structure of the first embodiment, not only is the use and management of a protective cap obviated, but also the opening and closing operation of the lens covers 22, 23 is facilitated. In addition, since the lens covers 22, 23 are shunted to the central portion, they serve as a central parting strip of the lens hood 17.

Figure 5:
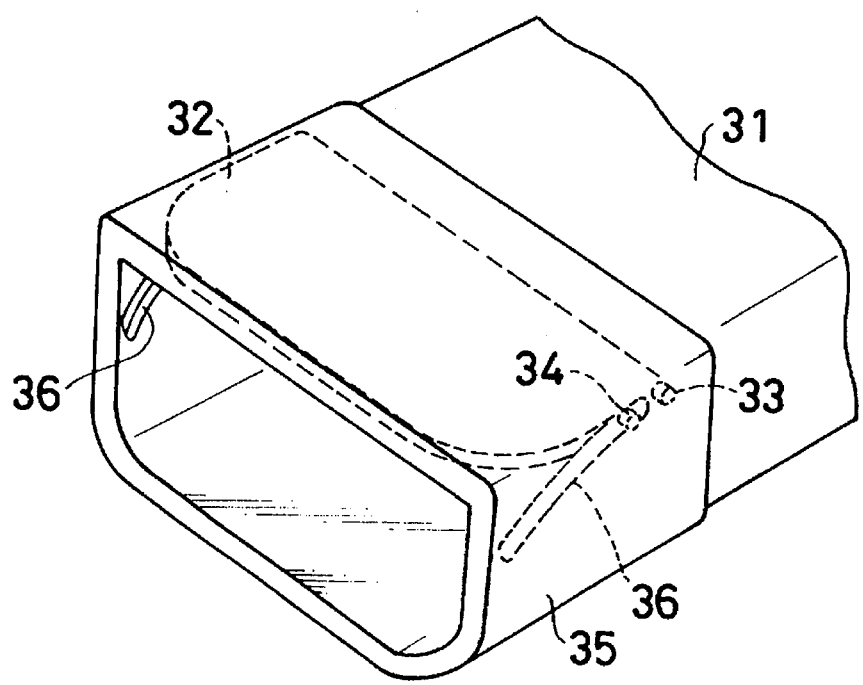
FIG. 5 is a perspective view of the structure of a second embodiment of a telescope (binocular telescope) provided with automatically opening and closing lens covers according to the present invention.

FIG. 5 shows the structure of a second embodiment. In this embodiment, one lens cover is used for a binocular telescope. As shown in FIG. 5, a lens cover 32 is supported by a horizontal support shaft 33, and guide pins 34 are attached to the side surfaces of the lens cover 32. Guide grooves 36 are formed on the inner surfaces on both sides of a lens hood 35, so that the guide pins 34 are engaged with the guide grooves 36.

Figure 6:
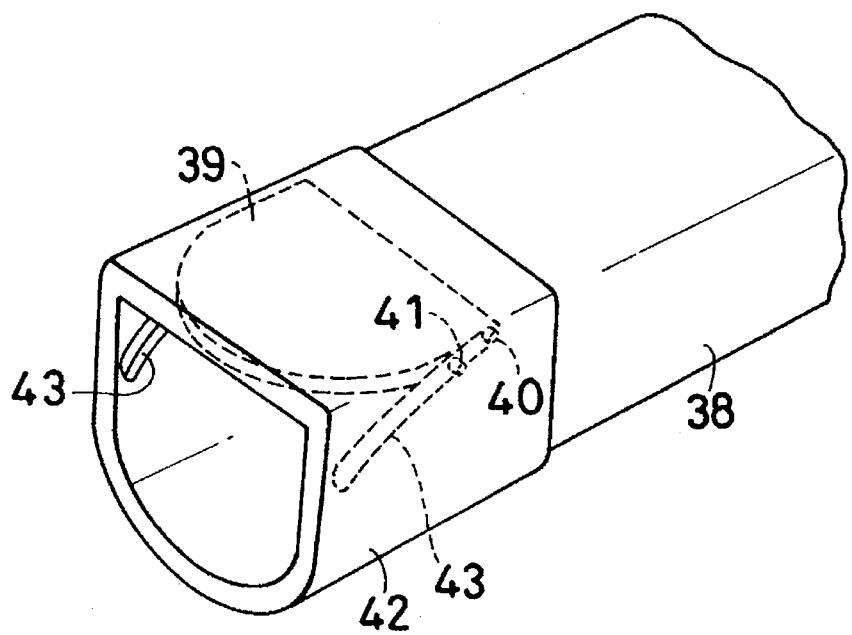
FIG. 6 is a perspective view of the structure of a third embodiment of a telescope (monocular telescope) provided with automatically opening and closing lens covers according to the present invention.

FIG. 6 shows the structure of a third embodiment. This is a monocular telescope having a similar structure to that of the second embodiment. A lens cover 39 is attached to the frame portion of a cylinder 38 of the main body incorporating a monocular lens (44) through a horizontal support shaft 40. Guide pins 41 are attached to the side surfaces of the lens cover 39. Guide grooves 43 are formed on the inner surfaces on both sides of a lens hood 42, so that the guide pins 41 are engaged with the guide grooves 43.

Figure 7:
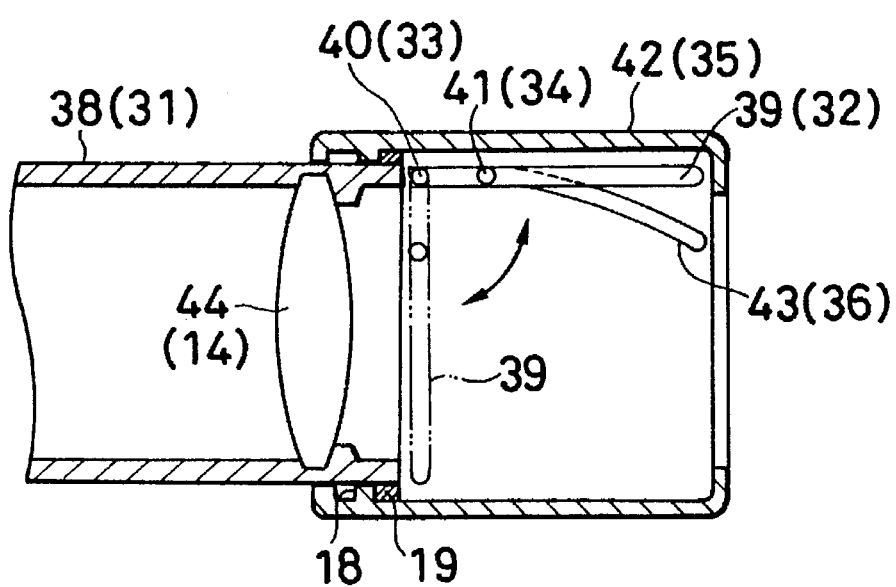
FIG. 7 is a sectional view (side elevational view) of the second or third embodiment when the lens cover is opened.

FIG. 7 is a sectional view (side elevational view) of the second or third embodiment. Only the third embodiment will be explained in the following. When the lens hood 42 is moved ahead of the cylinder 38, the guide pins 41 are moved along the guide grooves 43, so that the lens cover 39 is rotated 90 degrees from the upright position to the horizontal position which is parallel to the upper surface of the cylinder 38. Consequently, the lens cover 39 is opened, thereby enabling observation. On the other hand, when the lens hood 42 is moved backward, the lens cover 39 is rotated 90 degrees from the horizontal position to the upright position by the guide of the guide grooves 43, thereby closing the opening portion of the objective lens assembly.

According to the second and third embodiments, it is possible to automatically open or close the lens cover which is integrally attached to the cylinder of the main body, thereby obviating the use and management of a protective cap.

In each of the embodiments, the lens hood 17 (35, 42) is manually moved, but it may be moved forward and backward by an electric force. In addition, although the lens cover 22 (23, 32, 39) is rotated around the support shaft, it may be, for example, vertically elevated or lowered like a shutter together with the movement of the lens hood. Furthermore, it is also possible to apply the structure shown in FIG. 6 to each of the objective lens assemblies of a binocular telescope so as to enable the lens covers to be opened and closed separately from each other.

While there has been described what are at present, considered to be preferred embodiments of the invention, it will be understood that various modifications may be made thereto, and it is intended that the appended claims cover all such modifications as fall within the true spirit and scope of the invention.

What is claimed is:

1. A binocular telescope provided with automatically opening and closing lens covers comprising:

a main body comprising a pair of cylinders each having a forward end, a rear end, a central portion, and an outer peripheral portion;

a lens hood slidably disposed along an outer peripheral portion of the main body, said lens hood having an inner surface and an outer surface, and being slidable toward the forward end and the rear end of said main body;

a pair of objective lenses one of which is provided at a forward end of each of said cylinders;

a pair of movable lens covers each having a side surface and disposed to cover in correspondence said objective lenses provided at the forward end of said cylinders, each of said lens covers being axially rotatably supported between said objective lenses;

guide pins attached to said side surfaces of each of said lens covers;

a pair of guide grooves provided on the inner surface of said lens hood into which said guide pins are slidably engaged to cause said lens covers to rotate into a closed position covering said objective lenses when the lens hood is slid toward the rear end of the main body, and into an open postion when the lens hood is slid toward the forward end of the main body, whereby said lens covers are automatically shunted out of the optical path of the central portion of the main body so as to serve as a central parting strip of said lens hood of the binocular telescope by a forward movement of the lens hood, and to automatically cover said objective optical lenses by rearward movement of said lens hood.

2. A telescope provided with an automatically opening and closing lens cover comprising:

a main body comprising a cylinder and having a forward end, a rear end, a central portion, and an outer peripheral portion;

a lens hood having an inner surface and an outer surface and disposed along an outer peripheral portion of said main body to be slidable towards the forward end and the rear end of said main body;

an objective lens provided at one end of said cylinder;

a movable lens cover having a side surface and disposed to cover in correspondence said objective lens, said lens cover being axially rotatably supported at the outer peripheral portion of said main body;

a guide pin attached to the side surface of said lens cover;

a guide groove provided on the inner surface of said lens hood into which is slidably engaged said guide pin, said guide groove shaped to cause said lens cover to rotate into a closed position covering said objective lens when the lens hood is slid towards the rear end of said main body and in an open position when the lens hood is slid toward the forward en of the main body, whereby said lens cover is automatically shunted out of the optical path of the telescope by a forward movement of said lens hood, and automatically covering said objective lens by rearward movement of said lens hood.

3. A telescope provided with an automatically opening and closing lens cover according to claim 2, wherein said telescope is a monocular telescope.

4. A telescope provided with an automatically opening and closing lens cover according to claim 2, wherein said telescope is a binocular telescope.

* * * * *